United States Patent [19]
Schneider

[11] 3,966,002
[45] June 29, 1976

[54] PORTABLE VEHICLE SCALES

[75] Inventor: Henry Allen Schneider, Spokane, Wash.

[73] Assignee: Breakthrough Research & Development Corporation, Spokane, Wash.

[22] Filed: Sept. 12, 1974

[21] Appl. No.: 505,490

[52] U.S. Cl................................. 177/136; 177/210
[51] Int. Cl.² ....................................... G01G 19/08
[58] Field of Search ............... 177/136, 210; 73/141

[56] References Cited
UNITED STATES PATENTS

| | | | |
|---|---|---|---|
| 3,000,101 | 9/1961 | Giardino | 177/210 |
| 3,241,626 | 3/1966 | Woodburn | 177/137 |
| 3,314,493 | 4/1967 | Kennedy | 177/210 |
| 3,381,767 | 5/1968 | Rairigh | 177/210 |
| 3,565,195 | 2/1971 | Miller | 177/210 |
| 3,678,378 | 7/1972 | Trott et al. | 324/61 R |

Primary Examiner—L. T. Hix
Assistant Examiner—Vit W. Miska
Attorney, Agent, or Firm—Wells, St. John & Roberts

[57] ABSTRACT

Portable vehicle scales are described for weighing vehicle loads. The scales are low profile with a ground-engaging base. A wheel support platform is spring-supported on the base for supporting the applied wheel load. A plurality of calibrated springs support the platform with the springs being compressed in linear proportion to the magnitude of the applied load. Variable capacitor transducers are utilized to translate the change in deflection to a change in capacitance. The change in capacitance is measured by an electrical system and displaced in a digital readout device in units of weight. The variable capacitor transducers are constructed of discs of metal electrodes separated by layers of elastic dielectric material. The layers of elastic dielectric material compress in response to the deflection of the springs to change the transducer capacitance.

7 Claims, 8 Drawing Figures

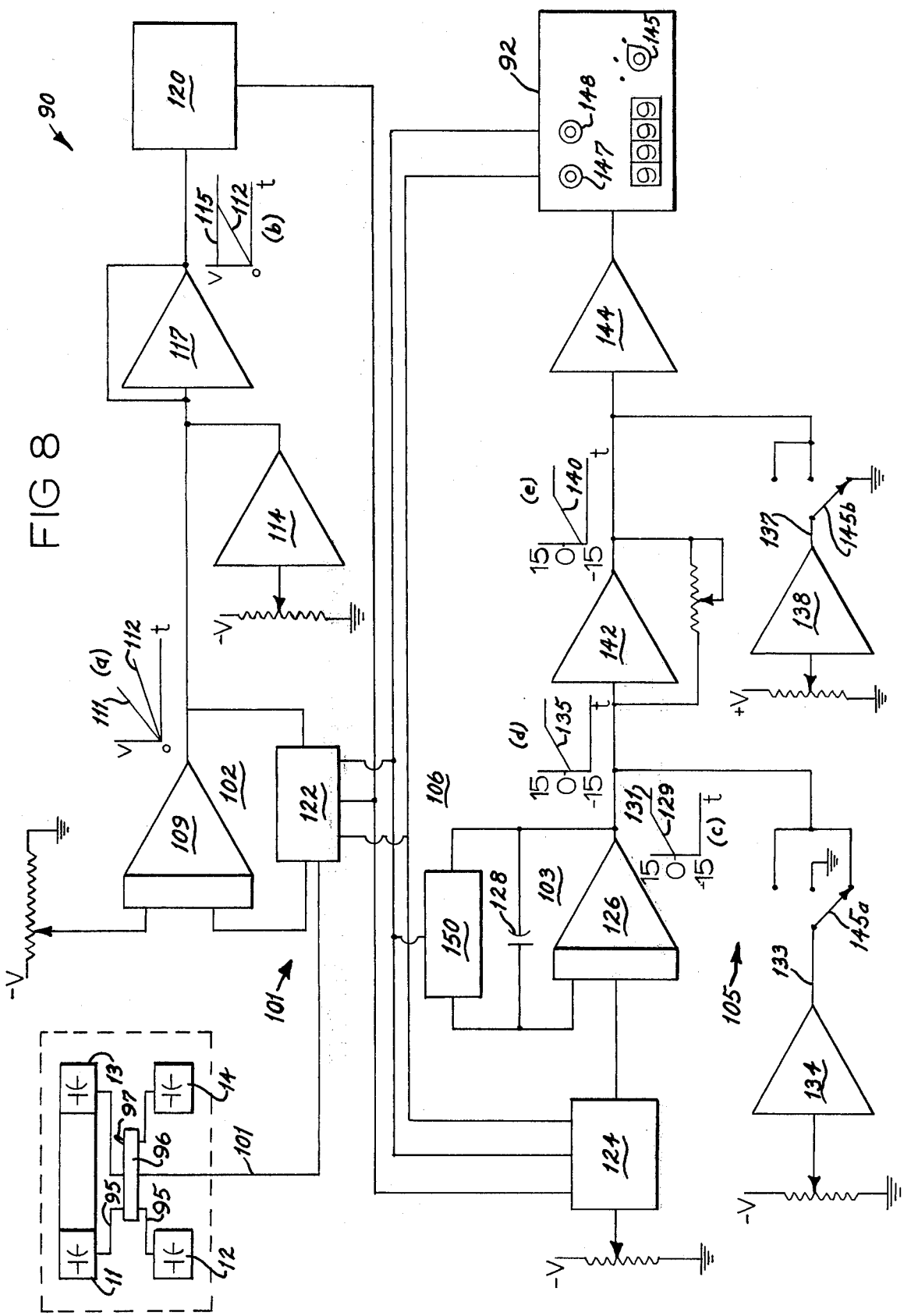

PORTABLE VEHICLE SCALES

BACKGROUND OF THE INVENTION

This invention relates to weighing instruments and more particularly to portable scales for weighing vehicle loads.

For many years there has been a need for portable scales for vehicles that could be easily carried to various locations and utilized to weigh vehicles and their heavy loads. Although several types of different portable scales have been devised for this purpose, none have received wide acceptance because of their inaccuracies and difficulties in reliability.

One of the principal objects of this invention is to provide portable vehicle scales that can be easily transported from one location to another in which the scales are extremely accurate for measuring the vehicles and their loads.

An additional object of this invention is to provide portable vehicle scales that are capable of accurately weighing a wide range of vehicular loads.

A further object of this invention is to provide portable vehicle scales that are extremely sturdy and capable of operating in a wide range of climatic conditions.

An additional object of this invention is to provide portable vehicle scales that may be easily assembled for weighing loads of tandem axle vehicles such as large trucks and trailers.

A further object of this invention is to provide portable scales which resist lateral movement in a very effective and efficient manner without materially affecting the accuracy of the scales.

A further object of this invention is to provide portable vehicle scales that have the unique means of preloading the scales to a desired level without adversely affecting the accuracy of the scales.

A still further object of this invention is to provide portable vehicle scales having variable capacitor transducers with electrical systems for accurately measuring capacitance change in the transducers.

These and other objects and advantages of this invention will become apparent upon reading the following detailed description of a preferred embodiment.

BRIEF DESCRIPTION OF THE DRAWINGS

A preferred embodiment of this invention is illustrated in the accompanying drawings, in which:

FIG. 8 is a schematic block diagram of the electrical system for measuring changes in the variable capacitor transducers and visually displaying such change in terms of the load weight on the scales.

DETAILED DESCRIPTION OF A PREFERRED EMBODIMENT

Figure 1:
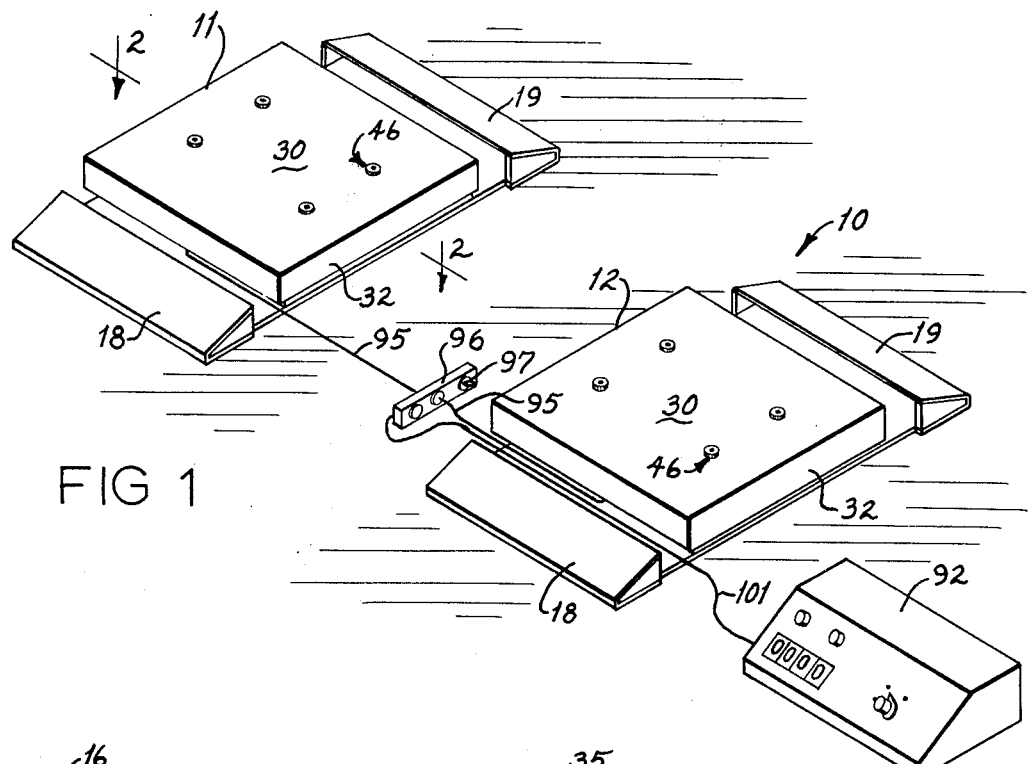
FIG. 1 is a perspective illustration view of portable vehicle scales having two scale units for front or rear wheels of a vehicle for measuring the weight of the vehicle or its vehicle load.
Figure 4:
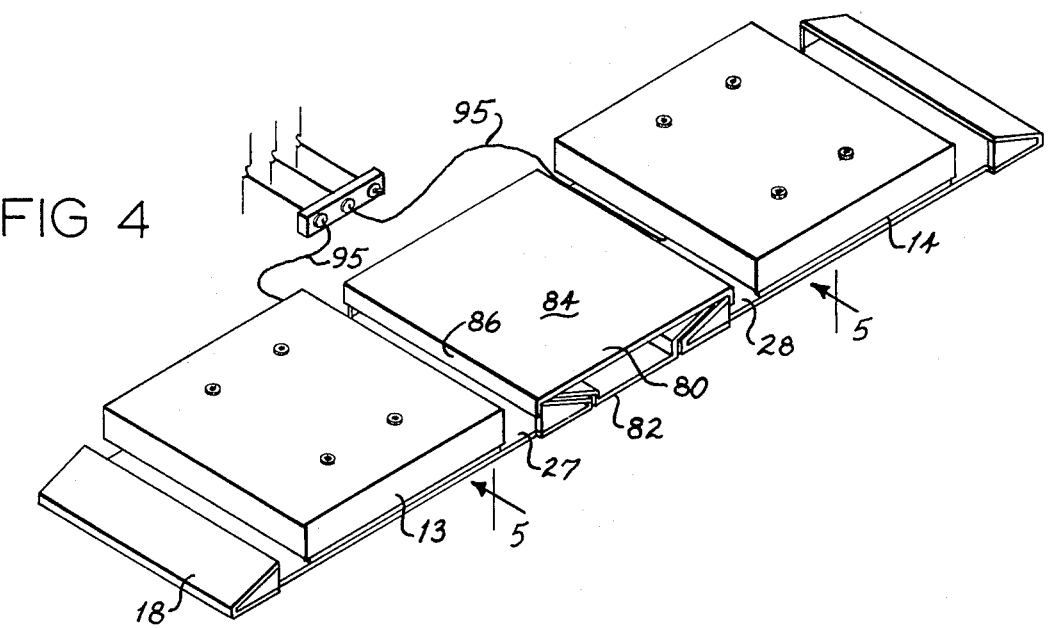
FIG. 4 is a perspective view showing two scale units mounted for receiving and weighing loads of tandem wheel vehicles in which the two scale units are interconnected by a bridge.

Referring to the drawings, there is illustrated in FIG. 1, low profile portable scales for receiving vehicle wheels and for measuring the weight of the vehicle and/or its load. The portable vehicle scale arrangement is generally indicated with a numeral 10. FIG. 1 shows two portable scale units 11 and 12 for receiving individual vehicle wheels respectively. FIG. 4 illustrates a portable vehicle scale system having two tandem scale units 13 and 14 for receiving tandem wheels. It should be understood that the scale units may be arranged in various arrangements depending upon the wheel structure of the vehicle. Each portable scale unit may be interconnected to others to form a portable scale arrangement. Each unit 11-14 is portable and may be interconnected electrically with other scales to form the complete system.

Figure 2:
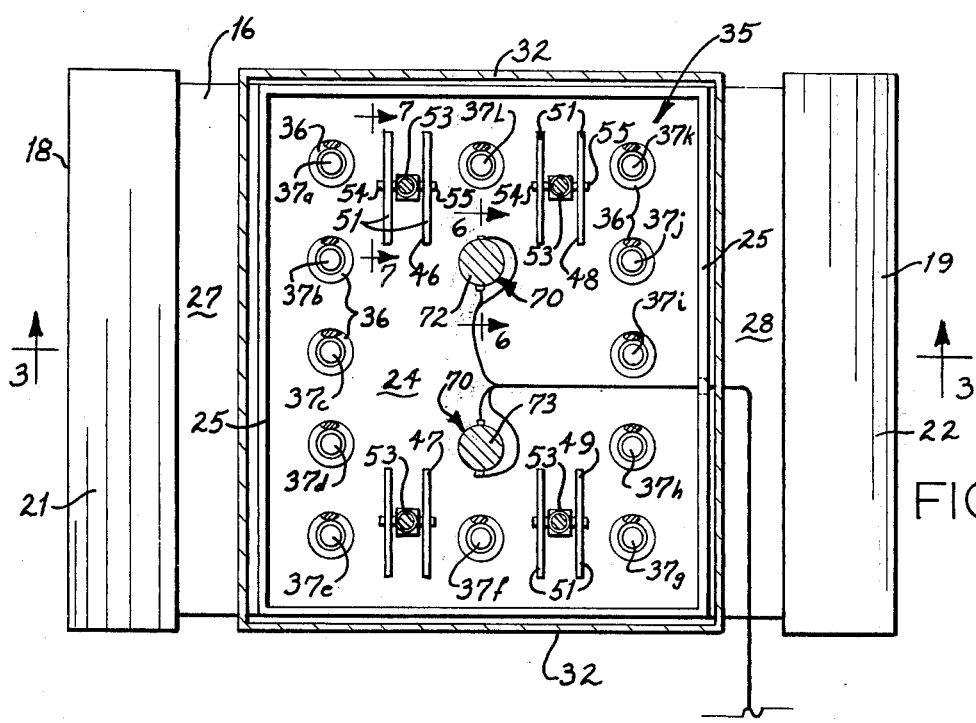
FIG. 2 is a plan view of a single scale showing interior portions with a platform or cover removed to illustrate internal mechanisms.

Each scale unit 11 includes a base 16 (FIGS. 2 and 3) that may be ground supported. The base 16 includes an elongated plate 17 extending between ends 18 and 19. The ends 18 and 19 have portions that are folded back upon themselves at outward inclined angles to provide inclined surfaces 21 and 22. The inclined surfaces 21 and 22 facilitate movement of the vehicle wheels onto and off the scale unit. The base 16 has a central portion 24 with an upstanding circumscribing flange 25. In this particular embodiment, the flange 25 is rectangular in plan view. The flange 25 is centrally spaced between the ends 18 and 19 spaces 27 and 28 therebetween.

Each scale unit 11 includes a vehicle wheel platform 30 (FIGS. 1 and 3) for receiving the vehicle wheel. The platform 30 includes a plate 31 that has a circumscribing flange 32 that extends downwardly in telescopically complementary relative to the upstanding flange 25 of the base 16.

Each scale unit 11-14 has a load support means generally designated with the numeral 35 for supporting the weight of the vehicle and its load on the scale unit. More particularly, the load support means 35 supports the platform 30 above the base 16 enabling the platform 30 to be moved downwardly proportionally to the load applied to the platform. The load support means 35 provides two functions — (1) to support the load and (2) to enable the platform to move downwardly a distance proportional to the load applied.

The load support means 35 includes a plurality of compression springs 36 mounted in an array on the central portion 24 of the base between the base 16 and the platform 30 for supporting the platform 30 and the applied load. The number of springs that are mounted on the base may be varied dependent upon the range of load desired to be weighed. The springs are mounted in various spring positions 37-1. Each of the springs is a deflection calibrated coil spring of a prescribed length.

For example, in one specific scale unit construction, each coil spring has a maximum load capability of 1,950 pounds with a maximum deflection of 0.6 inches. For measuring loads up to 7,800 pounds, four springs 36 would be utilized mounted at positions 37a, e, g and k. If a maximum load of up to 11,700 pounds is desired to be weighed, six springs 36 would be required and would be positioned at positions 37a, c, e, g, i and k. For a maximum weight of up to 15,600 pounds, eight springs would be utilized in positions 37a, c, e, f, g, i, k and l. For a maximum weight of up to 19,500 pounds, 10 springs would be utilized in the positions in 37a, b, d, e, f, g, h, j, k, and l. For a maximum load weight of 23,400 pounds per unit, 12 springs would be utilized at all of the spring positions shown.

Figure 3:
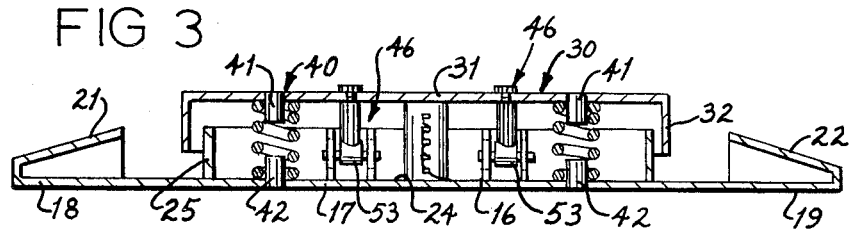
FIG. 3 is a vertical cross-sectional view taken along line 3—3 in FIG. 2.

Each scale unit 11-14 has spring receiving means 40 (FIG. 3) for securing each of the springs in an upright position between the platform 30 and the base 16. The spring receiving means 40 includes opposing upper pins 41 and lower pins 42 (FIG. 3). The pins 41 and 42 are spaced so that the unloaded distance between the ends of the pins is less than the maximum deflection of each of the springs. For example, if the maximum deflection of the springs is 0.6 inches then the distance between the ends of the pins 41 and 42 would be 0.5 inches so that the pins engage each other and bottom out before the springs are fully deflected. Thus, the spring receiving means 40 also provides a safety feature. Additionally, the spring receiving means 40 prevents the platform 30 from moving substantially lateral with respect to the base.

Although a specific rectangular arrangement is illustrated, various other types of arrangements or positions of the springs may be utilized depending upon the desired application.

Figure 7:
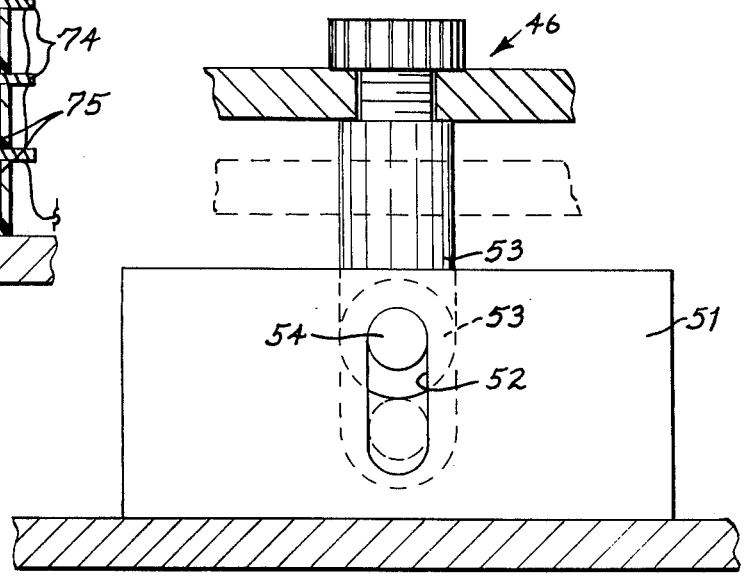
FIG. 7 is a vertical cross-sectional view taken along line 7—7 in FIG. 2 illustrating in more detail a preloading mechanism.

Each of the scale units 11-14 has means 45 (FIGS. 2 & 7) for pre-loading the compression springs 36 a pre-described amount. The pre-loading means 45 includes hold-down elements 46-49. Each of the hold-down elements 46-49 includes a pair of upright spaced ears affixed to the base 16 and extending upwardly. Each of the ears has a vertical slot 52 (FIG. 7) formed therein in which the length of the slot 52 is greater than the maximum allowable deflection of the springs 36. For example if the springs are allowed to deflect 0.5 inches, then the length of the slot would be 0.6 inches or longer in length. Each hold-down element 46-49 has a slide block 53 with pins 54 and 55 extending horizontally outwardly therefrom for riding in the vertical slots 52. The sliding block has a shaft 67 with a threaded hole that is directed upwardly toward the platform 30 for receiving hold-down bolts 68. The distance between pins 54 and 55 and the top of shaft 67 is very important. Bolts 68 are threaded into the shaft 67 to pull the platform 30 downwardly until the platform 30 engages the top end of the shaft 67. This compresses (preloads) each spring a desired amount. In one specific example, the distance of compression is 0.1 inches which causes a pre-loading of approximately 390 pounds per spring. The pre-loading significantly increases the accuracy of the scales and prevents movements that may interfere with the accuracy of the instrument.

Each of the scale units 11 has means 70 for measuring the deflection of the springs and consequently the weight that is applied to each unit 11-14. In this specific embodiment, the means 70 includes variable capacitor transducers 72 and 73. The transducers 72 and 73 are centrally located. The transducers do not support the weight of the applied load, but merely are responsive to the deflection of the springs or the compression of the distance between the base 16 and the platform 30.

Figure 6:
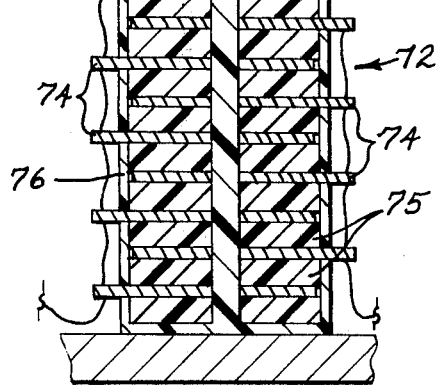
FIG. 6 is a vertical cross-sectional view taken along line 6—6 in FIG. 2 showing in vertical cross-section a variable capacitor transducer for measuring spring deflection.

The variable capacitor transducers 72, 73 are constructed utilizing metallic electrically conductive plate or disc electrodes 74 (FIG. 6) separated by layers 75 of elastic dielectric material. Each of the electrodes 74 has a connecting tab. Preferably the elastic dielectric material is natural sponge rubber. It is found that natural sponge rubber has a considerable longer life and is more accurate than other types of resilient or elastic dielectric materials that have been tried. As the springs depress, the distances between the electrodes 74 change linearly in proportion to the deflection of the springs causing the capacitance of the transducers to change substantially linearly. The transducers are encapsulated in a protective flexible rubber or plastic coating 76.

Figure 5:
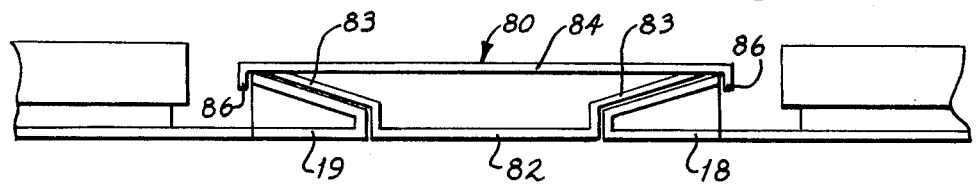
FIG. 5 is a plan view of the arrangement illustrated in FIG. 4.

In a different physical layout, the scale system 10 includes a bridge unit 80 (FIGS. 4 & 5) that may be utilized to interconnect two of the scale units in tandem as illustrated in FIG. 4. The bridge unit includes a base 82 that may be ground supported. Inclined sides 83 extend outwardly and upwardly in opposite directions complementary to the unit ends 18 and 19. A support plate or platform 84 is mounted on the base 82 at substantially the same level as the deflected elevation of the platform 30. The base 82 is positioned between bases 16 of the scale units with the inclined sides 83 extending upward and outward complementary to the inclined surfaces 21 and 22 respectively. The bridge 80 enables the wheels to move over the bridge from one unit to another. The platform 84 has overhanging ledges 86 that extend downward into the spaces 27 and 28 respectively to lock or secure the scale units 13 and 14 together to prevent any substantial shifting or movement of one unit with respect to the other. The tandem arrangements may be easily disassembled by merely picking up the bridge unit or sliding the bridge unit laterally to separate the scale units 13 and 14.

As previously mentioned, the load on the scale units 11-14 is supported by the group of springs 36, which, in response to the load, are compressed a distance proportional to the weight of the load. The dimensional change is linearly related to the load. The transducers 72 and 73 measure the compressive displacement of the springs 36. The variable capacitance transducers 73 and 72 transfer the dimensional displacement to changes in electrical capacitance that is proportional to the dimensional change.

The scale system 10 includes an electrical means, generally designated with the numeral 90 shown schematically in FIG. 8 for sensing the capacitance of the transducer and translating the capacitance into a voltage that is scaled to be representative of the weight acting on the springs. The scale voltage is applied to a display unit 92 that numerically displays the weight of the vehicle or the weight of the load on the vehicle as will be explained more fully further on. The display 92 is illustrated as a digital readout device.

In describing the electrical means 90 more specifically, cables 95 from each of the scale units 11-14 are applied to a junction box 96. The junction box 96 has a switch 97. The switch 97 includes either the rear scale units 11 and 12 in the electrical circuit or includes all of the scale units 11-14. An output cable 101 extends from the junction box 96 to a remote location where the electrical signals are fed to an integrating network system generally designated with the numeral 101. The integrating network system 101 includes a variable capacitor integrating circuit 102, a timing integrating circuit 103, adjustment control circuit 105 and an operator control circuit 106.

The variable capacitor integrating circuit 102 includes a varactor operational amplifier operated as an integrating amplifier 109 in which the transducers 72 and 73 are connected in the amplifier feedback circuit to produce an integrating amplifier ramp (signal) illustrated schematically in a voltage-time chart in FIG. 8a. The slope of the output ramp signal varies dependent upon the capacitance fed to the integrating amplifier 109. In FIG. 8a ramps 111 and 112 are illustrated. Ramp 111 illustrates the signal caused with no load on the scales. Ramp 112 indicates a loaded scale signal.

A constant voltage reference 114 device utilizing an inverting operational amplifier produces a constant voltage that is fed along with ramp 112 to a threshold comparator 117. The signal from the constant voltage reference 114 is designated as numeral 115 in the voltage-time chart FIG. 8b. The threshold comparator 117 is likewise an operational amplifier that is connected as a comparator to change state when the voltage magnitude of the ramp 112 exceeds the reference constant voltage signal 115. When the threshold comparator 117 changes states, the analog output is fed to a unit 120 that is referred to as an analog to transistor-transistor level transfer to modify the signal to be compatible with transistor relay circuits that are utilized in the control circuit 106. A pulse from the unit 120 is communicated to a relay drive circuit generally designated with the numeral 112 for controlling the application of the transducers 72, 73 to the integrating amplifier 109. The pulse from unit 120 is also transmitted to a relay drive circuit 124 for controlling a voltage input to a timing integrating amplifier 126. The timing integrating amplifier 126 is likewise an operational amplifier that is modified for integration. The integrating amplifier 126 has a negative feedback circuit in which a reference capacitor 128 is located to produce an integrating output ramp 129 of a selected slope determined by the capacitor 128. The duration of the transducer ramp 112 defines the duration of the timing ramp 129. The voltage level 131 of the timing ramp 129 is linearly related to the capacitance of the transducers.

When the threshold comparator 117 changes state, indicating that the ramp 112 has exceeded the constant voltage reference signal 115, then the relay drive circuit 124 places the integrating timing amplifier 126 in a hold position so that the ramp 129 forms a voltage plateau 131. The magnitude of the plateau 131 is proportional to the time that it took the ramp 112 to reach the constant voltage reference signal 115. Consequently, the amplitude of the plateau 131 is proportional to the compacitance of the transducers 72 and 73 which translates into a measurement of the weight applied to the scale system. It is necessary in starting the timing ramp that an equivalent offset voltage below the zero voltage level be utilized allowing the timing ramp to climb at its normal rate from the zero level. In this way, the timing ramp climbs to zero in exactly the same time required for the ramp 111 to reach the constant voltage reference signal when the scale units 11–14 are empty.

The integrating network system 101 includes an adjustment circuit 105 that has a zero or gross weight adjustment sub-circuit 133. Sub-circuit 133 includes a zero gross weight adjustment reference 134 for modifying the starting voltage level of the ramp 129 to produce an offset ramp 135 that is parallel with the ramp 129 but is offset a desired amount so that when there is no weight on the scale units 11–14 then the display unit will read zero. The adjustment reference 134 physically utilizes an operational amplifier for its function. The offset ramp 135 is illustrated in FIG. 8d.

many occasions it may be desirable to only weigh the load on the vehicle and to subtract out the weight of the vehicle itself. Consequently, the adjustment circuit 105 includes a net weight adjustment sub-circuit 137 that includes a net weight reference 138 that is in the form of an operational amplifier. Consequently, when the scales are loaded with an empty container or vehicle, the net weight adjustment sub-circuit 137 would be adjusted so that the readout on the display is zero. When the container or vehicle then is loaded, then the visual display will indicate the net weight of the load with the load of the container or vehicle being automatically subtracted. The output from the net weight reference 138 is shown in FIG. 8e as an offset ramp 140. It should be noted that the offset ramp 140 is adjusted with respect to the zero offset ramp 135. The adjusted output of the integrating amplifier 126 is applied to a scale factor amplifier 142 for amplifying the signal by a desired factor. The amplifier 142 is an operational amplifier with an adjustable gain. The output from the scale factor amplifier 142 is applied to a summing amplifier 144 which is an operational amplifier with an addition circuit for summing the signals from the scale factor amplifier and the net weight amplifier 138. The signal from the assembling amplifier 144 is applied to a digital readout display unit 92 that converts the analog signal to a digital readout.

The display 142 has a selection switch 145 thereon with contacts 145a in the zero adjustment sub-circuit 133 and the contact 145b in the net weight adjustment sub-circuit 137. Additionally, the display unit includes a "run" pushbutton 147 and a "clear" pushbutton 148. The "run" pushbutton 147 is operatively connected to the relay drive circuits 122 and 124 for simultaneously starting the integration operation of the amplifiers 109 and 126. The "clear" pushbutton 148 is operatively connected to the relay drive circuit 122 and a relay drive circuit 150 for resetting the circuits to begin a subsequent "run".

Switch 145 selects the mode of operation. When the zero or gross mode is selected at switch 145, the zero or gross weight adjustment sub-circuit 133 is included into the input of the scale factor amplifier 142. The potentiometer of the zero weight reference then is adjusted so that the final reading upon the digital panel meter 92 is zero. This is assuming, of course, that there is no weight on the scales.

When a container or vehicle is mounted on the scales and it is desired to weigh only the weight that may be subsequently contained in the container or on the vehicle, then the switch 145 is placed in the net mode and the run button 147 depressed. The net weight amplifier 138 then is adjusted so that the readout is zero.

When the switch 145 is placed in the "run" mode, both of the contacts 145a and b operate to place both the zero adjustment sub-circuit and the net weight adjustment sub-circuit 137 in the system so that the final readout will be the net weight of the load on the vehicle.

It should be understood that the above-described embodiment is simply illustrative of the principles of this invention and numerous other embodiments may be devised by those skilled in the art. Therefore only the following claims are intended to define this invention.

What is claimed is:

1. A portable vehicle load scales for weighing heavy wheel loads, comprising:
   a base;
   a weighing platform for receiving a vehicle wheel thereon;
   a plurality of calibrated compression springs mounted in an array on the base supporting the platform and the vehicle wheel above the base in which the springs are compressively deflected in proportion to the wheel load applied to the platform;
   pre-loading means operatively connected between the base and platform to move the base and platform closer together for initially compressively deflecting the array mounted springs to a desired loading prior to supporting the vehicle wheel on the platform;
   a variable capacitor transducer operatively connected between the platform and the base that is responsive to the compressive deflection of the springs for measuring the applied wheel load, said capacitor transducer comprising at least two electrodes separated by a layer of elastic dielectric material that is compressively responsive to the deflection of the springs with the electrical capacitance of the transducer varying in accordance with the deflection of the springs so that the magnitude of the electrical capacitance of the transducer represents the magnitude of the applied wheel load supported on the platform;
   and electrical means operatively connected to the transducer for measuring the magnitude of the electrical capacitance of the transducer and for visually displaying the magnitude in terms of the weight of the wheel load supported on the platform.

2. The portable vehicle load scales as defined in claim 1 wherein the layer of elastic dielectric material is comprised of natural sponge rubber.

3. The portable vehicle load scales as defined in claim 1 wherein the springs are calibrated coil springs and wherein the scales further comprise alignment means associated with the base and platform for supporting the springs upright between the base and platform.

4. The portable vehicle load scales as defined in claim 1 further comprising:
   a second base spaced from the first base;
   a second platform supported on the second base for receiving a second vehicle wheel tandem to the first vehicle wheel;
   a detachable bridge means operatively interconnecting between the first base and the second base to maintain the bases spaced a distance related to the space between the two tandem wheels to prevent one base from moving with respect to the other base.

5. The portable vehicle load scales as defined in claim 1 wherein the base has an upstanding flange formed thereon circumscribing the array of springs and wherein the platform has a downwardly projecting flange thereon circumscribing the array of springs in telescopic relation to the base of the upstanding flange.

6. The portable vehicle load scales as defined in claim 3 wherein the alignment means includes opposing elements affixed to the base and platform respectively for engaging opposite ends of the coil springs to maintain the springs upright during compressive deflection and to minimize lateral movement of the platform with respect to the base.

7. The portable vehicle load scales as defined in claim 6 wherein the opposing element includes opposing pins affixed to the base and platform respectively and projecting into opposing ends of the coil springs to maintain the coil springs upright and to minimize lateral deflection of one end of the springs with respect to the other end of the springs.

* * * * *